(12) United States Patent
Gassner et al.

(10) Patent No.: US 10,796,013 B2
(45) Date of Patent: *Oct. 6, 2020

(54) USER PROGRAMMATIC INTERFACE FOR SUPPORTING DATA ACCESS CONTROL IN A DATABASE SYSTEM

(71) Applicant: Veeva Systems Inc., Pleasanton, CA (US)

(72) Inventors: Peter Gassner, Pleasanton, CA (US); Andrew Han, Needham, MA (US); Igor Tsives, Shanghai (CN); Jon Stone, Manteca, CA (US)

(73) Assignee: Veeva Systems Inc., Pleasanton, CA (US)

( * ) Notice: Subject to any disclaimer, the term of this patent is extended or adjusted under 35 U.S.C. 154(b) by 44 days.

This patent is subject to a terminal disclaimer.

(21) Appl. No.: 15/811,470

(22) Filed: Nov. 13, 2017

(65) Prior Publication Data

US 2019/0147181 A1    May 16, 2019

(51) Int. Cl.
| | |
|---|---|
| *G11C 29/52* | (2006.01) |
| *G06F 21/62* | (2013.01) |
| *G06F 16/248* | (2019.01) |
| *G06F 16/242* | (2019.01) |
| *G06F 16/2457* | (2019.01) |
| *G06F 12/14* | (2006.01) |

(52) U.S. Cl.
CPC ........ *G06F 21/6218* (2013.01); *G06F 16/248* (2019.01); *G06F 16/2428* (2019.01); *G06F 16/24573* (2019.01); *G06F 21/6227* (2013.01); *G06F 2221/2113* (2013.01)

(58) Field of Classification Search
None
See application file for complete search history.

(56) References Cited

U.S. PATENT DOCUMENTS

| | | | |
|---|---|---|---|
| 9,092,137 B2 * | 7/2015 | Gassner | G06F 9/06 |
| 2005/0289111 A1 * | 12/2005 | Tribble | G06F 16/90335 |
| 2006/0206510 A1 * | 9/2006 | Moulhaud | G06F 21/6218 |
| 2007/0073688 A1 * | 3/2007 | Fry | G06F 16/164 |
| 2007/0150447 A1 * | 6/2007 | Shah | G06F 16/86 |
| 2008/0005287 A1 * | 1/2008 | Harvey | G06F 8/20 709/220 |
| 2008/0147647 A1 | 6/2008 | Reeb | |
| 2009/0287628 A1 | 11/2009 | Indeck | |
| 2012/0150685 A1 | 6/2012 | Hinojosa | |

(Continued)

OTHER PUBLICATIONS

Using JDOSecure to Introduce Role-Based Permissions to Java Data Objects-based Applications. Aleksy et al. (Year: 2006).*

(Continued)

*Primary Examiner* — Venkat Perungavoor

(57) ABSTRACT

Systems and methods for providing an API for a database system. The API may be provided to enable external application developers to build applications that can support the dynamic security model of the content management system and describe the runtime properties of records in data objects. The API of may provide a record property object and/or a query describe object when returning data set in response to a query by providing information about actions an end user can take on the data records, and to provide metadata required to understand a data response.

18 Claims, 6 Drawing Sheets

(56) References Cited

U.S. PATENT DOCUMENTS

| | | | |
|---|---|---|---|
| 2013/0086039 A1* | 4/2013 | Salch | G06F 21/6263 |
| | | | 707/717 |
| 2013/0117313 A1 | 5/2013 | Miao | |
| 2015/0220659 A1* | 8/2015 | Rissanen | G06F 16/9032 |
| | | | 707/759 |
| 2015/0254456 A1 | 9/2015 | Jacquin | |
| 2015/0363468 A1* | 12/2015 | Alvey | G06F 16/221 |
| | | | 707/769 |
| 2016/0119380 A1 | 4/2016 | Gutesman | |
| 2016/0255082 A1 | 9/2016 | Rathod | |
| 2016/0366183 A1 | 12/2016 | Smith | |
| 2017/0337391 A1* | 11/2017 | Chang | G06F 21/6218 |

OTHER PUBLICATIONS

Avoidance of Security Breach through Selective Permissions in Android Operating System. Sekar et al. ACM. (Year: 2012).*

Static Analysis for Extracting Permission Checks of a Large Scale Framework: The Challenges and Solutions for Analyzing Anfroid. Bartel et al. IEEE. (Year: 2014).*

Asghar et al., Supporting Complex Queries and Access Policies for Multi-user Encrypted Databases, ACM. 2013.

* cited by examiner

| Name | User | Role | Doc Type | Product | Country |
|---|---|---|---|---|---|
| DAC 001 | John Smith | Reviewer | Digital | Coldcap | USA |
| DAC 002 | Joan White | Owner | | Restalot | Canada |

FIG. 4

USER PROGRAMMATIC INTERFACE FOR SUPPORTING DATA ACCESS CONTROL IN A DATABASE SYSTEM

BACKGROUND

The subject technology relates generally to database management, and more particularly to an interface for supporting data record access control in database management systems.

Content management systems and other database management systems are widely used today. However, because of the large volume of documents in content management systems, large number of users, and their different permissions to access the documents, document access control has become more and more sophisticated. For example, some content management systems control user access to documents by their roles. Accordingly, it is desirable to provide a user interface so that developers, who build applications on a platform, e.g., a content management system, can make sure that their applications can access and display data in the content management system properly.

SUMMARY

The disclosed subject matter relates to a method for responding to a query in a database system. The method comprises: receiving record properties of a first data record and a second data record in the database system, wherein the record properties are defined dynamically based on application state. The method further comprises: receiving a first query for data objects in the database system; obtaining the first data record in response to the first query; obtaining record properties of the first data record; and displaying the first data record together with the record properties of the first data record on an interface.

BRIEF DESCRIPTION OF THE DRAWINGS

FIG. 4 illustrates an example user interface for receiving user setup records.

DETAILED DESCRIPTION

Figure 1:
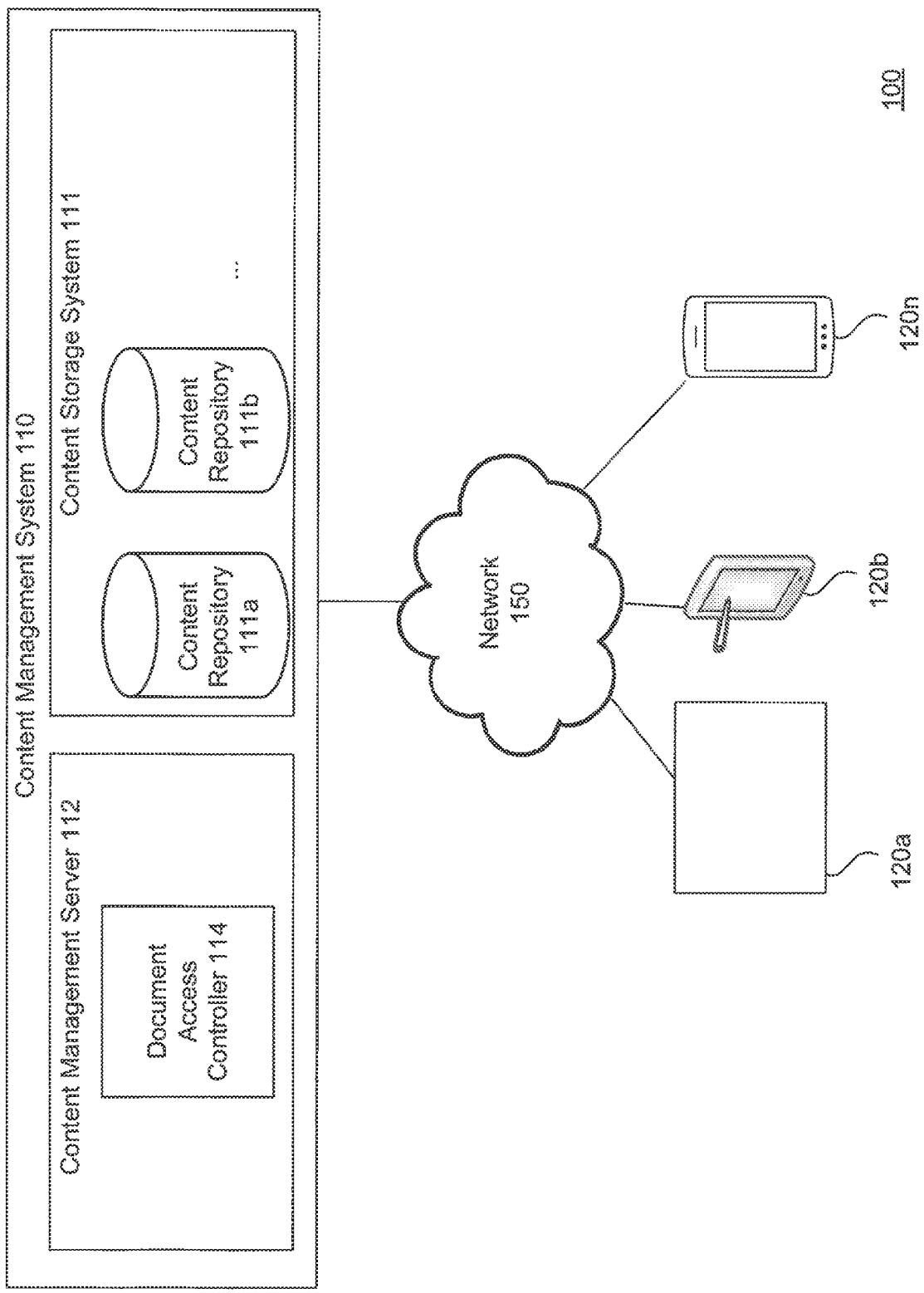
FIG. 1 illustrates an example high level block diagram of an enterprise content management architecture wherein the present invention may be implemented.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

In some content management systems, the permissions to access certain records and set of available actions on such records may be based on object states and user roles, and may be different for each record and user. This makes a static metadata describe application programming interface ("API") inadequate to accurately describe the record properties given user permissions. Understanding permissions, actions, and other properties of a record is critical for application development so that the application may present the correct behavior to the end user. For example, the application will need to be able to hide fields (or make fields visible), make fields read-only (or editable), validate user input and present a set of valid actions to the end user based on the configuration of the content management system and actions available to end user. The present invention enhances content management systems by providing a user interface to external application developers to enable them to build applications that can support the dynamic security model of the content management system and describe run-time properties of data object records.

Dynamic security may allow an administrator of a customer of the content management system to set up security rules, that may define not only access to a particular data record, but also access to a particular field within the data record, depending on a rule. With this type of granular security, when the content management system returns a set of records, it is desirable to provide information indicating what an end user can do with the data record (e.g., view, or edit). The user programmatic interface of the present invention may provide a record property object and/or a static query describe object when returning data set in response to a query to support the dynamic security by providing information about actions an end user can take on the data records, and to provide metadata required to understand a data response.

The present invention may be used in various development use cases. One example is external application built on a content management API (e.g., Veeva™ Align). The application, which runs externally (not in the content management process) but provides a user interface on the content management data, will require record properties, metadata, and CRUD to provide an acceptable user experience.

Some concepts of the present invention are defined below:

Configuration metadata. In the present invention, configuration metadata refers to the data that describes the configuration of the content management system. Configuration metadata is static and consistent across records and users. Relevant configuration metadata may include:
1. Permission Sets (Object and Object Field Permission),
2. Objects (Objects and Object Fields), and
3. State-Role field level security ("FLS") Rules.

Record properties. In the present invention, record properties refer to data that describes the run-time properties of an object record. The property values may be determined dynamically based on the application state, data, and configuration metadata. Property values will differ for each record and user.

Permission field level security ("FLS") in the present invention is FLS defined at the Permission Level.

State-Role FLS in the present invention is FLS defined based on Object state or the combination of object state and user role.

FIG. 1 illustrates an example high level block diagram of an enterprise content management architecture 100 wherein the present invention may be implemented. The enterprise may be a business, or an organization. As shown, the architecture 100 may include a content management system 110, and a plurality of user computing devices 120a, 120b, . . . 120n, coupled to each other via a network 150. The content management system 110 may include a content storage system 111 and a content management server 112. The content storage system 111 may have one or more content repositories, e.g., 111a and 111b. The network 150 may include one or more types of communication networks, e.g., a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 120a-120n may be any machine or system that is used by a user to access the content management system 110 via the network 150, and may be any commercially available computing devices including laptop computers, desktop computers, mobile phones, smart phones, tablet computers, netbooks, and personal digital assistants (PDAs).

The content storage system 111 may store content that user computing devices 120a-120n may access. Each content repository (e.g., 111a or 111b) may store a specific category of content, and allow users to interact with its content in a specific business context.

The content management server 112 is typically a remote computer system accessible over a remote or local network, such as the network 150. In one implementation, the content management server 112 may have a document access controller 114 which may control the process for setting up user roles, generating user groups, matching user groups and documents, and stamping user groups on matching documents.

In one implementation, the content management system 110 may be a multi-tenant system where various elements of hardware and software may be shared by one or more customers. For instance, a server may simultaneously process requests from a plurality of customers, and the content storage system 111 may store content for a plurality of customers. In a multi-tenant system, a user is typically associated with a particular customer. In one example, a user could be an employee of one of a number of pharmaceutical companies which are tenants, or customers, of the content management system 110.

In one embodiment, the content management system 110 may run on a cloud computing platform. Users can access content on the cloud independently by using a virtual machine image, or purchasing access to a service maintained by a cloud database provider.

In one embodiment, the content management system 110 may be provided as Software as a Service ("SaaS") to allow users to access the content management system 110 with a thin client.

Figure 2:
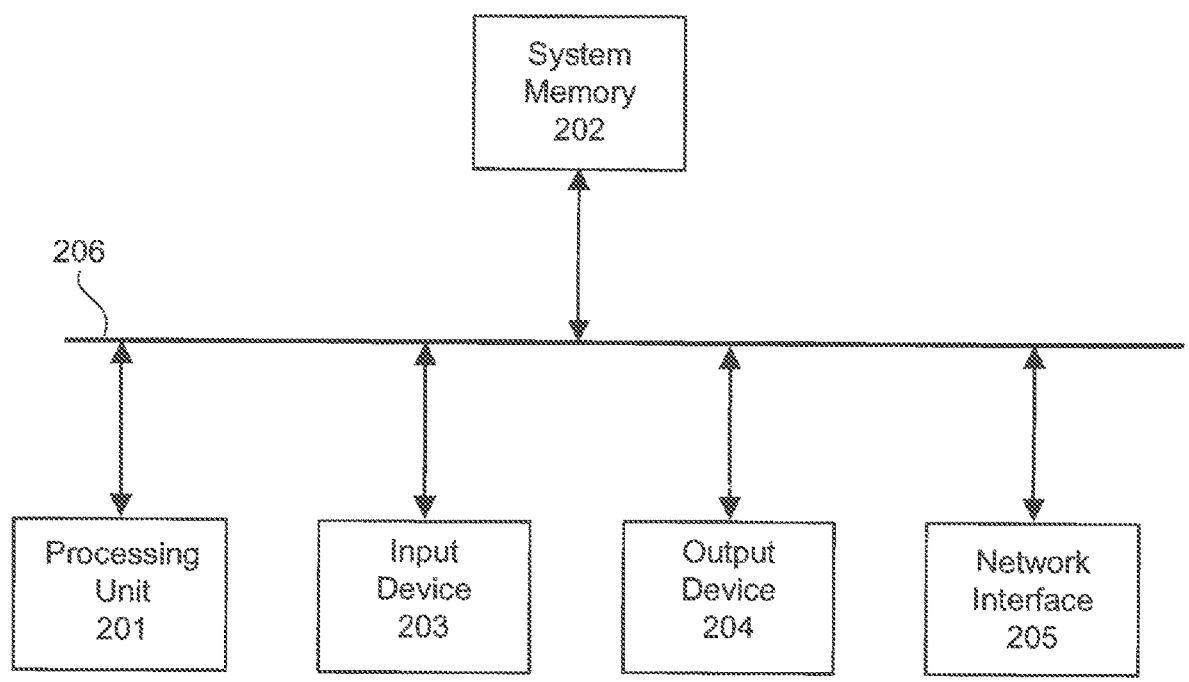
FIG. 2 illustrates an example high level block diagram of a computing device.

FIG. 2 illustrates an example block diagram of a computing device 200 which can be used as the user computing devices 120a-120n, and the content management server 112 in FIG. 1. The computing device 200 is only one example of a suitable computing environment and is not intended to suggest any limitation as to scope of use or functionality. The computing device 200 may include a processing unit 201, a system memory 202, an input device 203, an output device 204, a network interface 205 and a system bus 206 that couples these components to each other.

The processing unit 201 may be configured to execute computer instructions that are stored in a computer-readable medium, for example, the system memory 202. The processing unit 201 may be a central processing unit (CPU).

The system memory 202 typically includes a variety of computer readable media which may be any available media accessible by the processing unit 201. For instance, the system memory 202 may include computer storage media in the form of volatile and/or nonvolatile memory such as read only memory (ROM) and/or random access memory (RAM). By way of example, but not limitation, the system memory 202 may store instructions and data, e.g., an operating system, program modules, various application programs, and program data.

A user can enter commands and information to the computing device 200 through the input device 203. The input device 203 may be, e.g., a keyboard, a touchscreen input device, a touch pad, a mouse, a microphone, and/or a pen.

The computing device 200 may provide its output via the output device 304 which may be, e.g., a monitor or other type of display device, a speaker, or a printer.

The computing device 200, through the network interface 205, may operate in a networked or distributed environment using logical connections to one or more other computing devices, which may be a personal computer, a server, a router, a network PC, a peer device, a smart phone, or any other media consumption or transmission device, and may include any or all of the elements described above. The logical connections may include a network (e.g., the network 150) and/or buses. The network interface 205 may be configured to allow the computing device 200 to transmit and receive data in a network, for example, the network 150. The network interface 205 may include one or more network interface cards (NICs).

Figure 3:
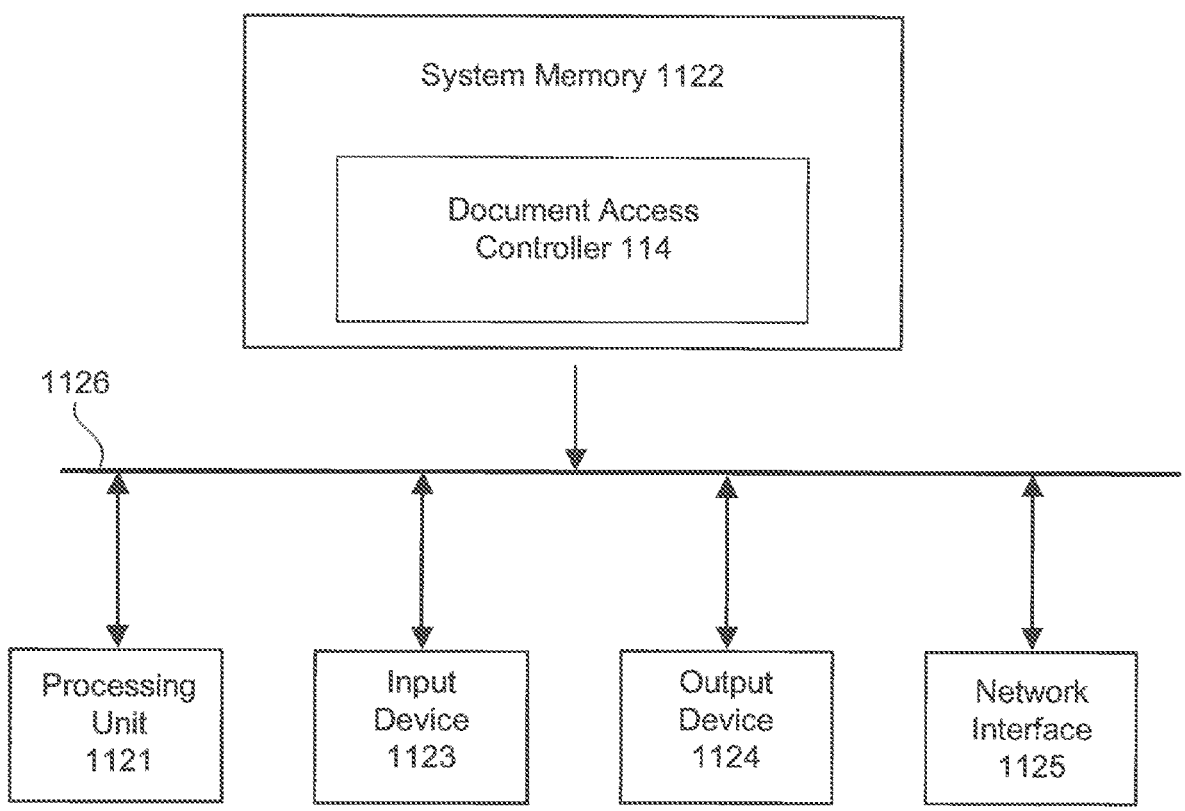
FIG. 3 illustrates an example high level block diagram of the content management server according to one embodiment of the present invention.

FIG. 3 illustrates an example high level block diagram of the content management server 112 according to one embodiment of the present invention. The content management server 112 may be implemented by the computing device 200, and may have a processing unit 1121, a system memory 1122, an input device 1123, an output device 1124, and a network interface 1125, coupled to each other via a system bus 1126. The document access controller 114 may be stored in the system memory 1122.

An enterprise may subscribe the content management service as a customer. End users may play different roles when accessing documents, e.g., owner and reviewer. In one implementation, end user setup records may be used to define the roles. As shown in FIG. 4, the end user setup records may be included in a table, and each end user setup record may have one or more fields. The fields may define the end user's access permissions based on his/her responsibilities and/or skill sets, and may include role, product, country, document type and other attributes.

A customer's system administrator may define what role(s) an end user may play, assign end users, or employees, different roles, and manage the roles with the end user setup records. A system administrator may use attributes in fields of the user setup records to group users depending on its business need. The system administrator may select default fields and/or attributes provided by the content management system 110, or add new fields and/or attributes to customize user roles. In one example, one user setup record may define a user as a reviewer, who is familiar with a product Coldcap and a country Canada. An end user's access to a data record in the content management system 110 may depend on the role assigned to him/her.

Figure 5A:
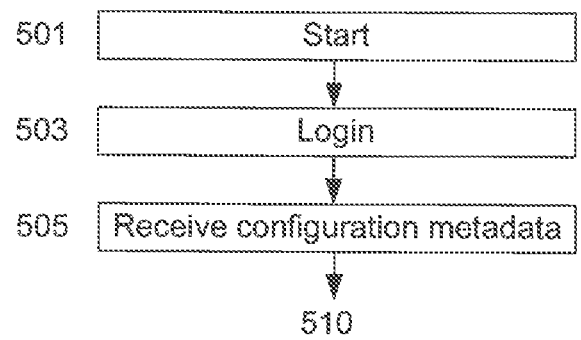
FIGS. 5A and 5B illustrate an example flowchart of a method for providing a user interface to support data access control in a content management system according to one embodiment of the present invention.
Figure 5B:
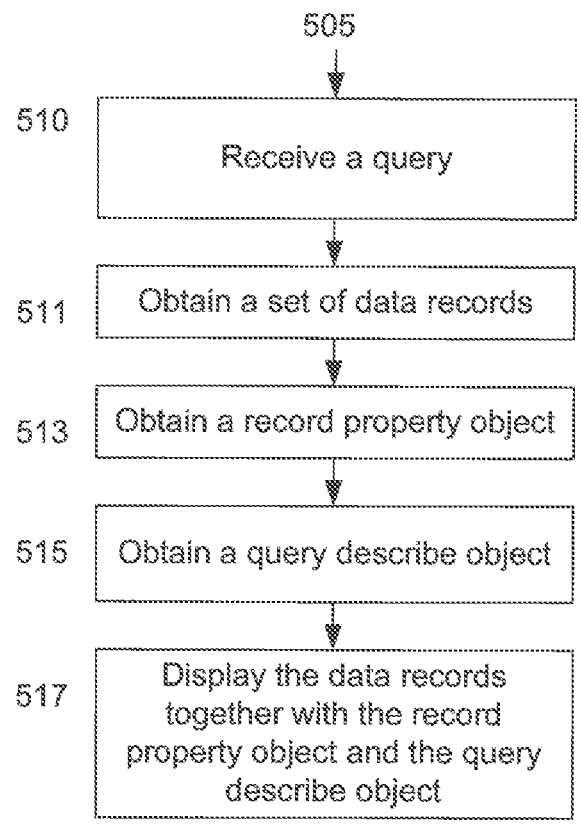

FIGS. 5A and 5B illustrate an example flowchart of a method for providing a user programmatic interface according to one embodiment of the present invention. The process may start at 501.

At 503, a system administrator may login to the content management system 110.

At 505, the content management system 110 may receive configuration metadata from the system administrator. The configuration metadata may provide information about each record that is coming back in a response, for example, if the user has certain permissions on the particular record (e.g., edit and delete), and if a particular record field is editable or hidden from the user.

A record property object describes the properties of a data record, and may include information on why a field is not displayed, e.g., hidden. For each record it may include:
1) Record id;
2) Record permissions—consistent with permission set actions (Read, Edit, and Delete); and
3) Record user actions—list of user actions available on this record with link to perform each action.

For requested fields on the record the response may include:
1) Edit—array of fields that are editable; and
2) Hidden—array of fields that are hidden.

One example of a record property object is as follows:

```
"id": "0VP000000000101
"permissions":
    "read": true,
    "edit": true,
    "delete": false
"field_properties":
    "edit": ("component_name"),
    "hidden": ("component_name", "component_type")
```

In one example, a record may have five fields. One field may be read-only to an end user. The way it is represented may be: it will not be shown in "edit", and not shown in "hidden". Return may include an array of fields that are editable, and an array of fields that are hidden.

A query may be received at 510.

At 511, a set of data records responsive to the query may be obtained from the content management system 110 and returned by the content management server 112.

At 513, a record property object may be generated for each data record in the set of data records and returned by the content management server 112.

To eliminate the complexity in understanding a query response, a query describe object may be generated by the content management server 112 and returned as part of the response to a query at 515, and may provide static metadata required to understand a data response. It may include:
1) Field name, Label
2) Data type
3) Max Length, Min/Max Values
4) Uniqueness
5) Status (Active, Inactive)

Examples of a couple of query describe objects are shown below:

```
"query_describe": {
    "name": "product_v",
    "label": "Product",
    "label_plural": "Products",
    "metadata": [
        {
        "label": "ID",
        "type": "ID",
        "required": false,
        "name": "id",
        "status": [
            "active_v"
            ]
        },
        {
        "label": "Product Name",
        "type": "String",
        "required": true,
        "unique": true,
        "name": "name_v",
        "status": [
            "active_v"
            ]
        "max_length": 128,
```

In one example, when a response has four fields, the query describe object may provide metadata about each field and describe the shape of fields queried, including its name, its readable label, its datatype, and if it is a required field, unique field, a string, a number or a boolean. That metadata may apply to all records in the response, and provide information on how to process the response data.

Although the set of data records, record property objects, and query describe objects are shown to be obtained at 511, 513 and 515 separately in FIG. 5B, it should be appreciated that they can be obtained simultaneously.

At 517, the set of data records may be displayed together with the record property objects and the query describe objects on a user interface.

In one implementation, the query with properties pattern can be used by an external application which requires records and record properties for a set of records. This pattern will retrieve both with a single API call, reducing roundtrips. The response in this pattern contains both the "data" object and "record_property" object as a pair of symmetric arrays.

In one implementation, the reporting component of the content management system may have the requirement to filter data on the client side of the query language. In order to support this functionality when the query comes from reporting, the response may include hidden data fields and a client, e.g., an external program, is required to perform the hiding on the client side.

In one implementation, an error may be returned when a field is requested but the end user does not have access to. In one implementation, fields may not be returned for any cell (row-field) that the user does not have access to.

The present invention may be applied to any data query and any system that returns a data set, e.g., SQL. For example, an API that returns records from a relational database, may return record properties.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs. Examples of computer programs or computer code include machine code, for example is produced by a compiler, and files including higher-level code that are executed by a computer, an electronic component, or a microprocessor using an interpreter.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more.

What is claimed is:

1. A method for responding to a query in a database system, comprising:
   receiving configuration metadata of a first data record and a second data record in the database system, wherein the configuration metadata comprises information on a first data access control rule of the first data record and a second data access control rule of the second data record;
   receiving a first query for data objects in the database system;
   obtaining the first data record in response to the first query;
   obtaining record properties of the first data record, wherein the record properties describe run-time properties of the first data record and include at least one record user action available on the first data record;
   obtaining a query describe object in response to the first query, wherein the query describe object provides information on how to process the first data record; and
   displaying the first data record together with the record properties of the first data record, including at least one record user action available on the first data record, on a user interface.

2. The method of claim 1, wherein the record properties are defined dynamically based on the configuration metadata.

3. The method of claim 2, wherein the configuration metadata comprises permission based data access control information.

4. The method of claim 3, wherein the permission based data access control information comprises permissions for user actions on the first data record.

5. The method of claim 3, wherein the permission based data access control information comprises permissions for user actions on a first field of the first data record.

6. The method of claim 4, wherein the permissions for user actions comprise information indicating if a first end user can edit the first data record.

7. The method of claim 4, wherein the permissions for user actions comprise information indicating if a first end user can delete the first data record.

8. The method of claim 1, wherein the first data access control rule is based on a first end user's role when accessing the first data record.

9. The method of claim 1, wherein the first data access control rule is based on a state of the first data record.

10. The method of claim 8, wherein the first end user's role is defined in an end user setup record.

11. The method of claim 8, wherein the first data access control rule indicates if a first field of the first data record is hidden from the first end user.

12. The method of claim 1, wherein the record properties comprise information about a reason that a first field of the first data record is hidden.

13. The method of claim 1, wherein the record properties indicate if a first field of the first data record is editable.

14. The method of claim 4, wherein the record properties comprise record permissions which are consistent with permissions for user actions on the first data record in the configuration metadata.

15. The method of claim 1, wherein the record properties comprise user actions available on the first data record.

16. The method of claim 1, wherein the query describe object comprises a data type of a first field of the first data record.

17. The method of claim 16, wherein the query describe object indicates if the first field of the first data record is a required field.

18. A content management system, comprising:
   a first content repository for storing a first data record and a second data record; and
   a content management server for:
      receiving configuration metadata of the first data record and the second data record in the first content repository, wherein the configuration metadata comprises information on a first data access control rule of the first data record and a second data access control rule of the second data record;
      receiving a first query for data objects in the content management system;
      obtaining the first data record in response to the first query;
      obtaining record properties of the first data record, wherein the record properties describe run-time properties of the first data record and include at least one record user action available on the first data record;
      obtaining a query describe object in response to the first query, wherein the query describe object provides information on how to process the first data record; and
   displaying the first data record together with the record properties of the first data record, including at least one record user action available on the first data record, on a user interface.

* * * * *